United States Patent [19]

Bachman et al.

[11] Patent Number: 4,493,025
[45] Date of Patent: Jan. 8, 1985

[54] DIGITAL DATA PROCESSING SYSTEM USING UNIQUE MEANS FOR COMPARING OPERATIONAL RESULTS AND LOCATIONS AT WHICH SUCH RESULTS ARE TO BE STORED

[75] Inventors: Brett L. Bachman, Boston, Mass.; James T. Nealon, Cary, N.C.; Charles J. Young, Berlin, Mass.

[73] Assignee: Data General Corporation, Westboro, Mass.

[21] Appl. No.: 266,412

[22] Filed: May 22, 1981

[51] Int. Cl.³ ............................................. G06F 13/00
[52] U.S. Cl. ..................................... 364/200; 364/749
[58] Field of Search ............... 364/749, 748, 745, 737, 364/200 MS File, 900 MS File

[56] References Cited

U.S. PATENT DOCUMENTS

| | | | |
|---|---|---|---|
| 3,539,790 | 11/1970 | Shimabukuro | 364/749 |
| 3,569,685 | 3/1971 | Chesley | 364/745 |
| 4,021,655 | 5/1977 | Healey et al. | 364/749 |
| 4,161,784 | 7/1979 | Cushing et al. | 364/749 |
| 4,224,677 | 9/1980 | Kindell et al. | 364/749 |
| 4,305,134 | 12/1981 | Joyce et al. | 364/745 |

Primary Examiner—Charles E. Atkinson
Attorney, Agent, or Firm—Robert F. O'Connell

[57] ABSTRACT

A data processing system having a flexible internal structure, protected from and effectively invisible to users, with multilevel control and stack mechanisms and capability of performing multiple, concurrent operations, and providing a flexible, simplified interface to users. Addressing mechanisms allow permanent, unique identification of information and an extremely large address space accessible and common to all such systems. Addresses are independent of system physical configuration and includes length field information specifying the number of data bits at the addressed location. In accordance with the invention as used in such system, the processor includes arithmetic logic (ALU) means for performing operations on operands. The number of bits in the results of such operations are compared with the number of bits specified by the length field of an address of the location to which the result can be transferred to indicate when such numbers of bits are not equal.

1 Claim, 1 Drawing Figure

DIGITAL DATA PROCESSING SYSTEM USING UNIQUE MEANS FOR COMPARING OPERATIONAL RESULTS AND LOCATIONS AT WHICH SUCH RESULTS ARE TO BE STORED

CROSS REFERENCE TO RELATED APPLICATIONS

The present application is related to copending U.S. Pat. Applications Ser. Nos. 266,428, 266,528 and 266,532 filed concurrently herewith and assigned to the same assignee as the present application.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the systems's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates to a technique for handling of arithmetic logic unit (ALU) results which can be used in a data processing system of the type, for example, which is suitable for use in interconnected data processing networks, the internal structure of which is flexible, protected from users, effectively invisible to users, and provides a flexible and simplified interface to users. The data processing system may provide, for example, an addressing mechanism allowing permanent and unique identification of all information generated for use in or by operation of the system, and an extremely large address space which is accessible to and common to all such data processing systems. The addressing mechanism provides addresses which are independent of the physical configuration of the system and can identify the length (number of bits) of an address location by a length field thereof. The present invention provides means responsive to the results of an ALU operation upon operands and to the length field of an address location to which such results can be transferred. Such means compares the number of bits in the result with the number of bits specified by the length field and provides an indication when such numbers of bits are not equal.

It is thus an object of the present invention to provide an improved addressing mechanism suitable for use in large, interconnected data processing networks.

It is a further object of the present invention to provide an improved technique for handling arithmetic logic unit (ALU) results when transferring such results to an addressed location.

It is thus an object of the present invention to provide an improved addressing mechanism suitable for use in large, interconnected data processing networks.

Figure 1:
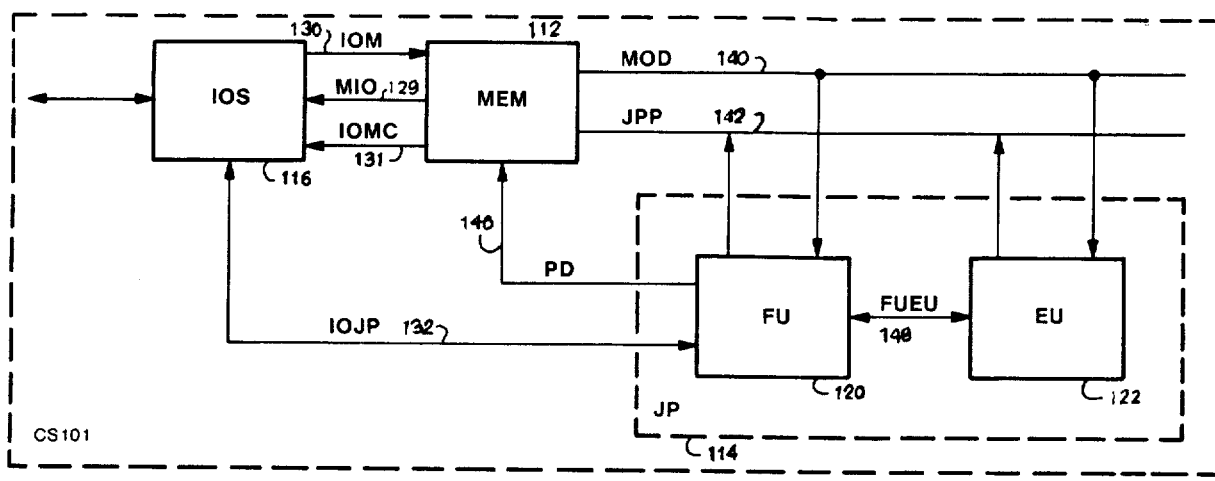
FIG. 1 is a partial block diagram of a computer system incorporating the present invention.

This application incorporates by reference the entire application, Ser. No. 266,402, filed on May 22, 1981, of Ward Baxter, II et al.

More particularly, attention is directed to FIGS. 203 and 264 of the drawings in application Ser. No. 266,402, and to that part of the descriptive portion of the specification, particularly at pages 580, 609-610 and 618-620 thereof, which relates to subject matter of the claims herein.

What is claimed is:

1. In a digital computer system including processor means for performing at least arithmetic operations on operands, memory means for storing at least instructions for directing the arithmetic operations performed by said processor means, first bus means for conducting said instructions and the results of said arithmetic operations between said memory means and said processor means, and further bus means for conducting operands between devices external to said digital computer system and said digital computer system, said processor means comprising:

ALU means connected to said first bus means and responsive to said instructions for performing arithmetic operations on said operands, addressing means connected to said first bus means and responsive to the operation of said ALU means for providing addresses specifying locations in said memory means to which the results of said arithmetic operations can be transferred, each address including a length field, and checking means responsive to the results of the operation of said ALU means to the length field of an address for comparing the number of data bits specified by said length field and the number of data bits in said results and indicating when the number of data bits specified by said length field is not equal to the number of data bits in said results.

* * * * *